Figure 1:
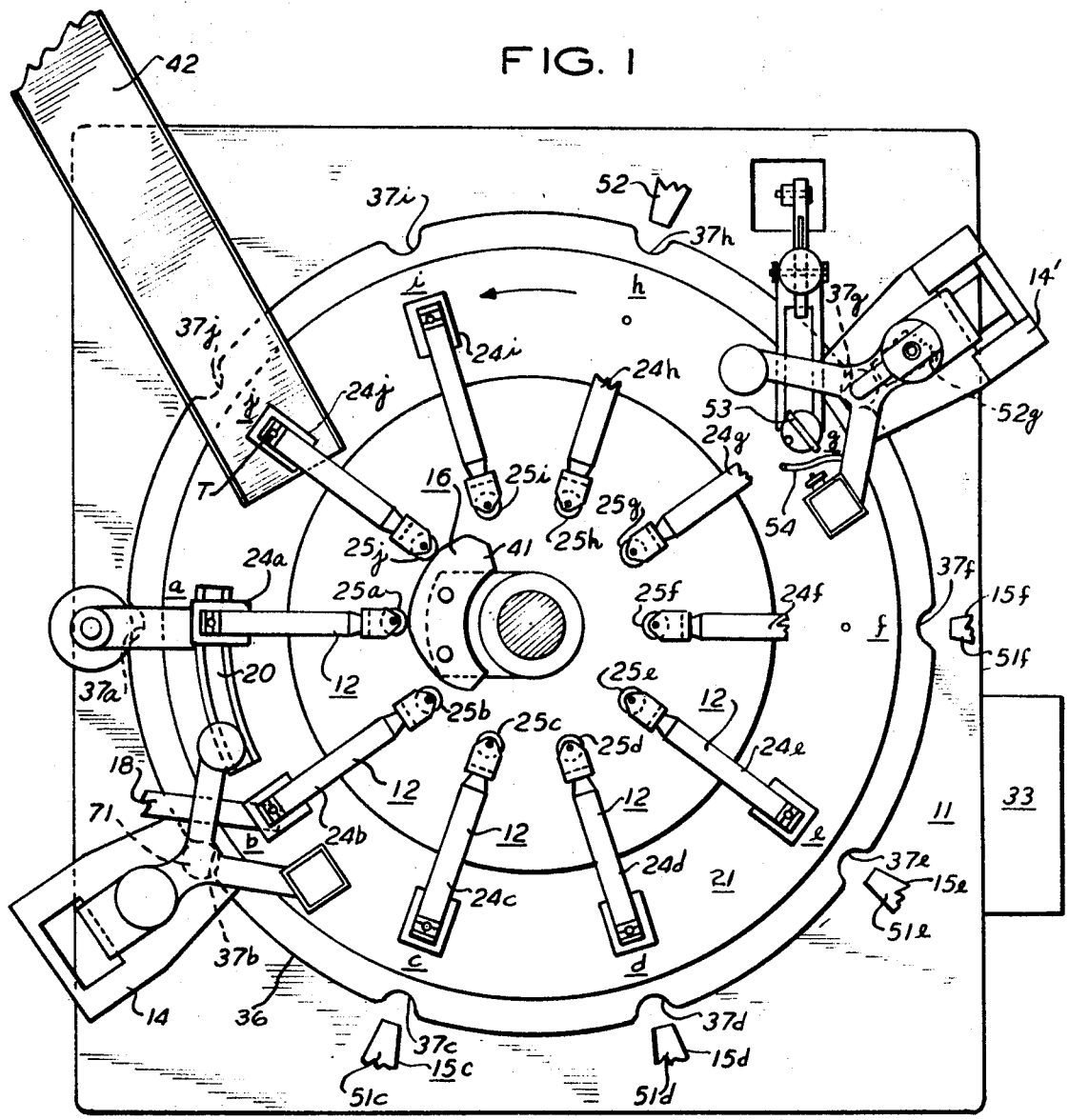

United States Patent

[11] 3,607,192

[72] Inventor Charles Eisler, Jr.
Short Hills, N.J.
[21] Appl. No. 769,552
[22] Filed Oct. 22, 1968
[45] Patented Sept. 21, 1971
[73] Assignee Eisler Engineerig Co.
Newark, N.J.

[54] MULTIPLE STATION AUTOMATIC CONTROL DEVICE FOR GLASS THERMOMETERS
7 Claims, 6 Drawing Figs.

[52] U.S. Cl. .................................................. 65/158, 65/29, 65/284, 65/285
[51] Int. Cl. ..................................................... C03b 23/10
[50] Field of Search ........................................... 65/29, 158, 285, 284; 73/DIG. 9

[56] References Cited
UNITED STATES PATENTS
2,882,523  4/1959  Barrett et al. .................. 65/158 X
2,990,648  7/1961  Chaney .......................... 65/DIG. 9
3,486,875  12/1969 Pymm ........................... 65/158
3,472,638  10/1969 Rosen............................ 65/29

Primary Examiner—S. Leon Bashore
Assistant Examiner—Robert L. Lindsay, Jr.
Attorney—Sommers & Sommers ABSTRACT: The disclosed invention is directed to an automatic, multiple-station turntable apparatus for automatic control of blister collapse in the production of thermometers. The turntable comprises a plurality of holders members for gripping the thermometer, equipment to move the turntable, a first projection and viewing station positioned beyond a loading station, and a heating station positioned beyond the first projection and viewing station to apply heat for collapsing the blister in the thermometer. A second projection and viewing station which includes a manual heat application means which is located beyond the first-mentioned heating station. An annealing station and a dispensing station are located on the last part of the turntable.

PATENTED SEP 21 1971 3,607,192

INVENTOR
C. EISLER, JR.
BY
Sommers & Sommers
ATTORNEYS

INVENTOR
C. EISLER, JR.

MULTIPLE STATION AUTOMATIC CONTROL DEVICE FOR GLASS THERMOMETERS

MULTIPLE STATION AUTOMATED CONTROL DEVICE

This invention relates to a production control device, and more particularly to a multiple-station automated control device for monitoring and controlling blister collapse in the production of thermometers.

Pursuant to the invention, the multiple-station automated control device provides convenient, simple, and efficient automatic monitoring and control of thermometer production during the stage of collapse of the blister in the thermometer, which is one of many intermediate stages in the production of clinical thermometers made from glass, and which device can be utilized generally to perform a similar function for the processing of any sealed-system device that is one under an internal vacuum, and which can be utilized for various products, for example specifically for the processing of clinical thermometers made from glass.

Devices proposed for this purpose heretofore have been objectionable due to their inefficiency in operation and requirement of expenditure of costly labor, time, and effort in the control of each stage in the blister collapse process of thermometer production on a single station device. These objections in devices heretofore proposed have been eliminated in the multiple station automated control device of this invention, which is highly efficient, strong durable, and rugged in use.

Figure 2:
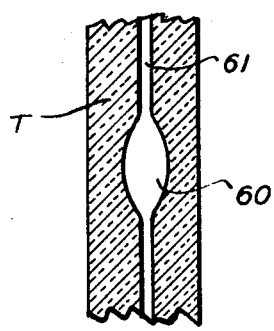
Figure 3:
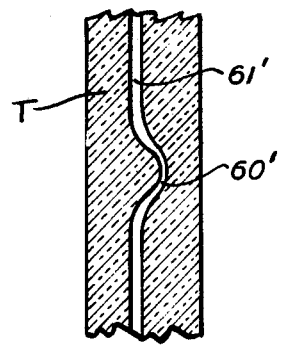
Figure 4:
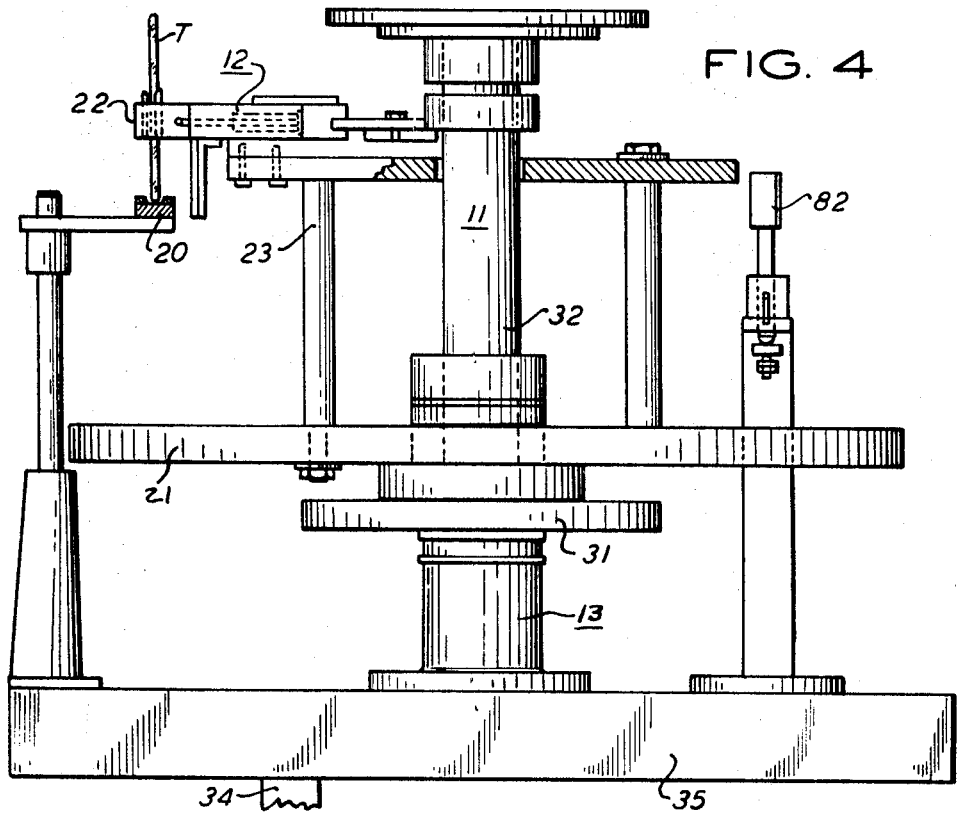
Figure 5:
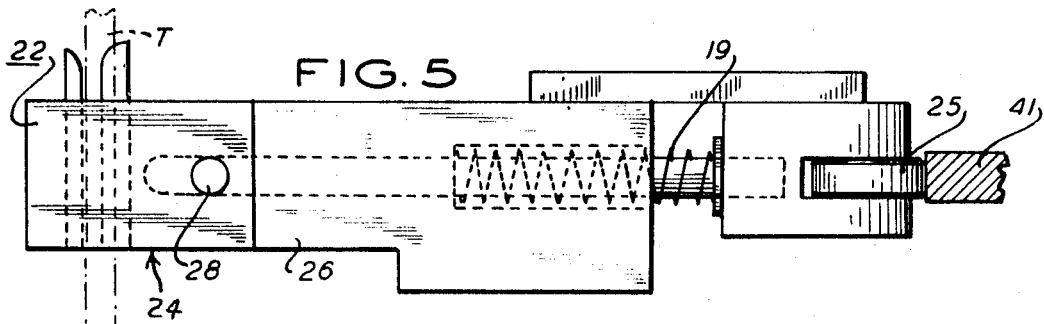
Figure 6:
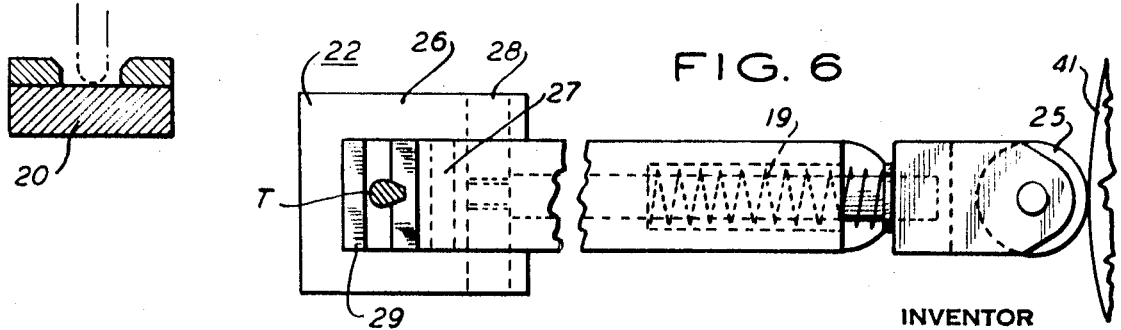

In the drawings, wherein similar reference characters indicate like parts:

FIG. 1 is a top plan view of a multiple station automated control device embodying the invention, FIG. 2 is an enlarged, fragmentary, vertical sectional view of a thermometer blister prior to collapse, FIG. 3 is a similar view of the thermometer blister after collapse, FIG. 4 is an end, elevational, partly sectional, view of the device shown in FIG. 1, FIG. 5 is an enlarged, vertical partly sectional view, of the holder member thereof, and FIG. 6 is a top plan view thereof.

As will be seen from the drawings, forming part hereof, this invention relates to a multiple-station automated control device, for controlling blister collapse in thermometer formation as will be described below, such that automated control is effectuated at the various stages of the collapse of the blister on a multistation automated device, to achieve efficient operation in the blister collapse process.

Pursuant to the invention, a multiple-station automated control device 11 (FIGS. 1 and 4) for example, is provided with supporting means 12, indexing means 13, projection means 14 and 14', heating means 15c, 15d, 15e, 15f, 52 and dispensing means 16.

The supporting means 12 (FIGS. 1 and 4) comprise track support means 20, turntable member 21, a plurality of holder members 22 and interconnection means 23. Each holder member 22 comprises clamping means 24 (FIG. 5) having cam follower means (25 FIG. 5; 25a–j FIG. 1) for coaction with fixed cam 41, tension means 19, (FIGS. 5,6), outer jaw member 26, inner jaw member 27 (FIG. 6) and (FIG. 5) connector 28 interconnecting the outer and inner jaw members.

The indexing means 13 (FIG. 4) comprises gear means 31 driven from a suitable drive source, shaft 32, keyed thereto, curved cam edge 36 and circumferential recesses 37 in the turntable member 21. Gear drive means 31 consists of a timer 33 (FIG. 1) connected through a microswitch (not shown) to a reduction drive shaft 34 (FIG. 4) which connects through gear means 35 and gear drive means 31 to shaft 32.

Heating means 15 (FIG. 1) comprises burner members 51c–f annealer member 52, heat screen 53, and airhose 54.

In operation (FIGS. 1 and 4), for example, the thermometer T will be placed by the operator in position a which is the initial loading position for operations on the thermometer (positions a through j being indicated on the exemplary device of FIG. 1). The thermometer will be inserted (into holder member 24a) in the space 29 between outer jaw member 26 and inner jaw member 27 (FIG. 6) and will be supported, (FIG. 5) initially, at the bottom thereof by the track support means 20, being loosely held (at station a) in the holder member 22 as at that station, the outer jaw member 26 (FIGS. 6 and 1) is maintained away from the inner jaw member 27 and by virtue of the movement of the roller 25 on cam edge 41 (FIG. 6) against the pressure of tension means 19 which, in stations at which the roller is clear of the cam edge 41. The indexing means 13 operates to move holder member 22a into position b (FIG. 1) by operation of gear means 31 and the shaft 32 and the turntable member 21 and the holder members 22 therewith counterclockwise. Just after the holder member 22 passes position a, it passes the end of cam edge 41 permitting the cam follower 25 to move (due to spring 19) toward the center of table 21 (FIG. 1) causing the outer jaw member 26 to lock into position with the inner jaw member 27, clamping the thermometer in the holder member 22. As the turntable member 21 and holder members 22 move to the next position, the cam follower 71 (which is situated on the front of projection means 14, FIG. 1), follows the curved cam edge 36 of the turntable member into the recess 37b whereupon the projection means 14 (for example, comprising a microscope which enlarges the image of the thermometer blister section, FIGS. 2 and 3, appearing on the screen) moves into line with the thermometer holder member 22 and projects an image of the thermometer blister section 60 (as shown in FIG. 2) on a screen (not shown). Indicating lines on the viewing screen inform the operator as to whether the thermometer is properly positioned in the holder member for the automatic operations to be performed. Adjustment of the thermometer can then be accomplished by movement of the position adjuster 18 (FIG. 1) which contacts the thermometer at the bottom and moves it up or down in the holder member 22. After the timed delay, as set in the timer 33, the gear drive means 31 causes the turntable 21 to revolve to the next position (c). The projection means 14 moves away from the path of holder member 22 as the cam follower 71 is cammed out of recess 37b and engages the curved cam edge 36 of the turntable member 21. At position c, burner member 51c applies heat to the thermometer blister portion. As the holder member 22 moves through positions d, e, and f progressively, burner members 51d, 3, and f respectively apply heat to the blister portion to cause it to gradually collapse. In position g, projections means 14' moves into line with thermometer T (in the same fashion as described above for projection means 14) and projects an image of the blister portion 60' as shown in FIG. 3, onto a screen (not shown) for the viewer to see to check the progress of blister collapse while burner member 52g applies heat to the blister portion. When the proper blister collapse has been achieved, the operator activates the heat screen 53 to block the burner member 52g, and air is introduced through airhose 54 (FIG. 1) to begin the cooling of the collapsed blister portion of the thermometer. In position h, the annealing member 52 applies soft fire to the blister portion to anneal or ease the glass strain. In position i, the thermometer cools and finally, in position i, the cam edge 41 and the holder member 22 make contact and the cam follower means 25 causes the outer jaw member 26 to move away from the inner jaw member 27 and release the collapsed and completed blister thermometer T to drop into the dispensing chute 42.

Thus the multiple-station automated control device of my invention may be simply and efficiently operated to provide automatic and continuous control in the production of blister collapse segments in the thermometer-manufacturing process, in a manner to increase productivity several fold over nonautomated production devices and enhance accuracy of production.

While the foregoing disclosure of exemplary embodiments is made in accordance with a Patent Statutes, it is to be understood that the invention is not to be limited thereto or thereby, the invention scope being defined in the appended claims.

1. A multiple-station automated control device, for automated control of blister collapse in the production of thermometers, comprising:
   a. a turntable member;
   b. a plurality of holder members, said members being interconnected to said turntable member for rotation therewith, and said members being adapted for gripping and supporting said thermometers;
   c. indexing means for moving said turntable and said thermometers to successive station positions about said turntable;
   d. loading station means, for receiving said thermometers into said holder members;
   e. first projection and viewing station means positioned about said turntable beyond said loading station, for permitting operator inspection of the positions of said thermometers in said holder members, said station including manually operable means for adjusting the position of said gripped thermometers;
   f. heating station means positioned about said turntable beyond said first projection and viewing station means, for applying heat to said thermometers to effectuate blister collapse in said thermometer;
   g. second projection and viewing station means positioned about said turntable beyond said heating station means, for permitting operator inspection of the said collapsed blisters, said second station means including additional heat application means and manually operable means enabling the operator to discontinue the operation of said heat application means upon observing appropriate blister condition;
   h. heat annealing station means, positioned about said turntable beyond said second projection and viewing station means, for applying soft heat to said thermometers to relieve strain therein; and
   i. dispensing station means positioned about said turntable beyond said heat annealing station means, for dispensing thermometers after completion of the blister collapse operation.

2. In a multiple-station automated control device, as described in claim 1, said indexing means further comprising:
   gear drive means, for rotating said turntable member and holder members about said multiple stations, and
   shaft member, for connecting said gear drive means with said turntable member and holder members.

3. In a multiple-station automated control device as described in claim 2, said dispensing means comprising cam means, for interaction with said holder members, to dispense said thermometers at one of said multiple stations on said device.

4. In a multiple-station automated control device as described in claim 3, said heating means comprising burners, positioned about said turntable member at a plurality of said multiple stations.

5. A multiple-station automated control device as described in claim 4, wherein each of said holder members comprises an outer jaw member and an inner jaw member, and tension means therein, and cam follower means, for interaction with said cam means of said dispensing means.

6. A multiple station-automated control device as described in claim 5, further comprising a track support means, for support of said thermometer at said loading station and during movement to said first projection and viewing station means.

7. In a multiple-station automated control device as described in claim 1, said dispensing means further comprising a dispensing chute, for catching said finished thermometers for collection thereof.